(12) United States Patent
Caviezel et al.

(10) Patent No.: US 11,772,369 B2
(45) Date of Patent: Oct. 3, 2023

(54) FUEL LINE, METHOD FOR PRODUCING SAME, AND USES THEREOF

(71) Applicant: EMS-PATENT AG, Domat/Ems (CH)

(72) Inventors: Heinz Caviezel, Masein (CH); Georg Stöppelmann, Bonaduz (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 16/956,924

(22) PCT Filed: Dec. 20, 2018

(86) PCT No.: PCT/EP2018/086281
§ 371 (c)(1),
(2) Date: Jun. 22, 2020

(87) PCT Pub. No.: WO2019/122180
PCT Pub. Date: Jun. 27, 2019

(65) Prior Publication Data
US 2020/0406590 A1 Dec. 31, 2020

(30) Foreign Application Priority Data
Dec. 22, 2017 (EP) ..................................... 17209960

(51) Int. Cl.
*B32B 27/08* (2006.01)
*B32B 1/08* (2006.01)
(Continued)

(52) U.S. Cl.
CPC ................ *B32B 27/08* (2013.01); *B32B 1/08* (2013.01); *B32B 27/20* (2013.01); *B32B 27/22* (2013.01);
(Continued)

(58) Field of Classification Search
CPC ........... B32B 27/08; B32B 1/08; B32B 27/20; B32B 27/22; B32B 27/306; B32B 27/34;
(Continued)

(56) References Cited

U.S. PATENT DOCUMENTS

2008/0057246 A1* 3/2008 Schwitter .................. B32B 1/08
428/36.6
2008/0145582 A1* 6/2008 Spence ................... B29C 41/22
428/36.6
(Continued)

FOREIGN PATENT DOCUMENTS

DE 600 04 907 T2 12/2005
DE 10 2005 061 530 A1 7/2007
(Continued)

OTHER PUBLICATIONS

International Search Report for PCT/EP2018/086281 dated Mar. 20, 2019 [PCT/ISA/210].
(Continued)

*Primary Examiner* — James C Yager
(74) *Attorney, Agent, or Firm* — Sughrue Mion, PLLC

(57) ABSTRACT

A multi-layer composite in the form of a hollow body enclosing an interior space (2) is proposed, consisting of three or four layers: an inner layer (3) adjoining the interior space (2), a middle layer (4) adjoining the latter and an outer layer (5) adjoining the middle layer (4) and closing the multi-layer composite (1) to the outside. If necessary, there is a further innermost layer (8) which directly adjoins the said inner layer (3) and is equipped with a conductive finish. The inner layer (3) is based on polyamide 6, the middle layer (4) is based on EVOH, and the outer layer (5) is based on a mixture of (A) polyamide 6 and (B) at least one other polyamide selected from the following group: polyamide 612, polyamide 614, polyamide 616 and polyamide 618.

33 Claims, 1 Drawing Sheet

(51) Int. Cl.
| | |
|---|---|
| *B32B 27/20* | (2006.01) |
| *B32B 27/22* | (2006.01) |
| *B32B 27/30* | (2006.01) |
| *B32B 27/34* | (2006.01) |
| *C08L 77/06* | (2006.01) |
| *F16L 11/08* | (2006.01) |
| *F16L 11/04* | (2006.01) |

(52) U.S. Cl.
CPC ............ *B32B 27/306* (2013.01); *B32B 27/34* (2013.01); *C08L 77/06* (2013.01); *F16L 11/08* (2013.01); *B32B 2250/03* (2013.01); *B32B 2250/04* (2013.01); *B32B 2250/24* (2013.01); *B32B 2270/00* (2013.01); *B32B 2307/202* (2013.01); *B32B 2307/7265* (2013.01); *B32B 2597/00* (2013.01); *B32B 2605/00* (2013.01); *C08L 2205/025* (2013.01); *C08L 2205/03* (2013.01); *F16L 2011/047* (2013.01); *Y10T 428/1352* (2015.01); *Y10T 428/1379* (2015.01); *Y10T 428/1383* (2015.01)

(58) Field of Classification Search
CPC ............ B32B 2250/03; B32B 2250/04; B32B 2250/24; B32B 2270/00; B32B 2307/202; B32B 2307/7265; B32B 2597/00; B32B 2605/00; B32B 1/02; C08L 77/06; C08L 2205/025; C08L 2205/03; F16L 11/08; F16L 2011/047; Y10T 428/1352; Y10T 428/1379; Y10T 428/1383

See application file for complete search history.

(56) References Cited

U.S. PATENT DOCUMENTS

| | | | |
|---|---|---|---|
| 2009/0269532 | A1 | 10/2009 | Ferreiro et al. |
| 2011/0139258 | A1* | 6/2011 | Doshi .................... B32B 27/34 |
| | | | 137/1 |
| 2014/0246111 | A1 | 9/2014 | Zimmer et al. |
| 2015/0353792 | A1 | 12/2015 | Montanari et al. |

FOREIGN PATENT DOCUMENTS

| | | |
|---|---|---|
| EP | 0 445 706 A2 | 9/1991 |
| EP | 1 036 968 A1 | 9/2000 |
| EP | 1 162 061 A1 | 12/2001 |
| EP | 1 216 826 A2 | 6/2002 |
| EP | 1 645 412 A1 | 4/2006 |
| EP | 1 884 356 A1 | 2/2008 |
| GB | 2 390 658 A | 1/2004 |

OTHER PUBLICATIONS

Written Opinion for PCT/EP2018/086281 dated Mar. 20, 2019 [PCT/ISA/237].

* cited by examiner

FUEL LINE, METHOD FOR PRODUCING SAME, AND USES THEREOF

CROSS REFERENCE TO RELATED APPLICATIONS

This application is a National Stage of International Application No. PCT/EP2018/086281 filed Dec. 20, 2018, claiming priority based on European Patent Application No. 17209960.8 filed Dec. 22, 2017.

TECHNICAL FIELD

The present invention relates to a tube, in particular for automotive fuels, of thermoplastic material, a process for manufacturing such a tube and uses of such tubes.

STATE OF THE ART

The use of fuel tubes based on layered structures of plastics, especially polyamide, has long been state of the art. Due to the requirements in terms of permeability for fuels as well as the required mechanical properties (e.g. impact strength, elongation at break) and chemical resistance both internally and externally at a wide range of temperatures, multilayer pipes are preferably used here, which are characterised by a high thermal load capacity, high length stability and high resistance to the fuels carried in them. A low permeation value is relevant here, whereby this low permeation value must not only be given for the fuel itself, but also for any additives or other minor components it may contain. Furthermore, resistance to the washing out of components or of parts of the multilayer structure is required.

From the US-A-2014/246111, fuel tubes for the automotive sector are known to have at least five layers and comprise barrier layers, adhesion promoter layers and other functional layers. In particular, a layer of fluoropolymer is provided on the inside and a layer of EVOH (ethylene vinyl alcohol copolymer) is provided as a barrier layer.

EP-A-1645412 describes cables for fuel cells made of thermoplastic materials. A layer of a polyamide moulding compound is proposed as the inner layer, and a wide variety of suggestions are made for subsequent possible layers, including EVOH layers. Concrete examples of layer structures are not given, and in order to ensure a bond between any EVOH layer that may be present and the polyamide inner layer, explicit reference is made to the need for an adhesion promoter in the form of a separate additional layer.

US-A-2009/269532 describes a tube consisting of at least two layers, both of polyamide, the gist is equipping the inner layer only with an organic stabilizer and explicitly not with a copper stabilizer. As an advantage it is emphasized that such structures should be improved against aging, especially in contact with hot air, compared to the state of the art and should be more resistant in contact with corrosive liquids. As far as three-layer structures with a central EVOH layer are revealed at all, these always have organic stabilization on the inside and copper stabilization on the outside.

US-A-2015/353792 describes adhesion promoter materials for use, for example, in multilayer fuel tubes. Complex copolyamides of the general structure AB/C, e.g. of the type 6/612/12, are proposed, and it is shown that adhesion between two different polyamide layers can be ensured in this way.

EP-A-445706 proposes layered structures as fuel tubes, which have at least 3 layers of at least 2 different polyamides. As a comparative example, a layer structure with an inner layer of impact modified polyamide 6, an intermediate layer of EVOH and an outer layer of impact modified polyamide 6 is worked and it is shown that such a structure is not sufficiently resistant to cold impact.

GB 2390658 discloses to include a fuel tube with an EVOH barrier layer, with an inner layer of polyamide 6 and an outer layer of polyamide 612, or with an inner layer and outer layer of polyamide 612. 150% elongation at break is achieved. The inner layer is preferably made of polyamide 612 or 610 and is directly adjacent to the EVOH layer. In particular, structures are revealed in which only three layers are present and in which the outer layers consist exclusively of polyamide 610, or polyamide 612 or polyamide 6. From EP-A-1036968, fuel tubes are known which have at least 4 layers, including a barrier layer of EVOH, and, as an adhesion promoter layer to an outermost layer of polyamide 12 or polyamide 11, a layer based on lactam or amino acid, respectively, or based on polyamide 69.

From EP-A-1216826, a multilayer composite with an EVOH layer is known to be used as a fuel tube, whereby a polyamide-polyamine copolymer is proposed as the material for an adhesion promoter layer to an outer layer, in particular based on polyamide 12. Due to the apparently observed poor adhesion of polyamides to EVOH, it is proposed to design a polyamide-based layer directly adjacent to the EVOH barrier layer as a special blend, whereby a plurality of polyamides as well as the presence of a polyamine-polyamide copolymer is considered necessary to ensure good adhesion in the first place even during prolonged contact with fuels. In the specific examples, the inner layer is always designed as a polyamide 6 layer due to the required resistance to fuels. Other possibilities of other polyamides are described, but no reference is made to specifically preferred polyamides, for example with regard to a particularly good adhesion to the barrier layer on the one hand and resistance to specific chemicals on the other.

Another state-of-the-art fuel tube is found in EP-A-1 452 307, which also provides an EVOH-based barrier layer, and in order to ensure adhesion to the barrier layer and good resistance to peroxide, it is specifically proposed that the inner layer should not be based on a polyamide 6 homopolymer, but on a blend of polyamide homopolymers containing a compatibilizer. Here too, different polyamide homopolymers are specified, but generally without giving specific details as to which polyamide homopolymers exhibit particularly good adhesion to the barrier layer and resistance to specific chemicals.

Furthermore, reference should be made to the two documents EP-A-1 036 968 and EP-A-1 162 061, which also describe thermoplastic multilayer composites that have a layer of EVOH as a barrier layer. Adjacent to this layer, EP-A-1 162 061 describes a layer of a moulding compound based on polyamide, whereby a large number of possible polyamides are specified in a general way. However, only an inner layer of polyamide 6 is specifically disclosed in the examples. In EP-A-1 036 968, special attention is paid to the fact that copolyamides exhibit improved adhesion to barrier layers of EVOH. The inner layers are always layers of blends of polyamide and polyolefin, or polyamide layers.

EP-A-1 884 356 describes a thermoplastic multilayer composite in the form of an extruded hollow profile comprising a thermoplastic outer layer and at least one further layer, the outer layer being formed from a mixture based on at least one polyamide (PA) and 20 to 80 parts by weight of at least one polyamide elastomer (TPE-A), and the hollow profile having been produced at extrusion speeds of more than 20 m/min, so that the hollow profile produced has a higher elongation at break of more than 200% compared with a hollow profile otherwise identical but produced at lower extrusion speeds. Only structures are worked in which mixtures of lactam-based polyamides are used as the outer layer (specifically PA12 and PA 6), or mixtures of PA12 with polyetheramide with PA 6 hard blocks are used.

PRESENTATION OF THE INVENTION

Accordingly, it is the object of the present invention to provide an improved multi-layer composite in the form of a hollow body enclosing an inner space. In particular, it to provide a good barrier effect with as few different layers as possible, i.e. avoiding adhesion promoter layers, in particular with a very high elongation at break, in particular with an elongation at break of more than 300%, i.e. excellent mechanical properties, in particular with regard to cold impact and elongation at break, and good wash-out resistance.

This object is achieved by a multi-layer composite according to claim 1.

The proposed multi-layer composite consists of three layers, an inner layer adjoining the interior, a middle layer adjoining the inner layer and an outer layer adjoining the middle layer and finishing the multi-layer composite on the outside. There are therefore no other layers, in particular no adhesion promoter layers, apart from the middle layer serving as a barrier layer and an inner layer and an outer layer. What there may be in addition is a further innermost layer, which is then made conductive. In this case, the inner layer mentioned above does not directly border on the inner space, but indirectly via this innermost layer, but it is still the case that all layers are directly adjacent to each other, i.e. the innermost layer, which directly borders on the inner space, borders directly on the inner layer to the outside, the inner layer borders directly on the middle layer, and the middle layer borders directly on the outer layer, and the outer layer is the outermost layer of the multi-layer composite.

The inner layer is based on polyamide 6, the middle layer is based on EVOH, and the outer layer is based on a mixture of polyamide 6 and at least one other polyamide, namely polyamide 612, polyamide 614, polyamide 616, polyamide 618 or a mixture thereof.

Surprisingly, it has been shown that this specific selection of materials in the specified layer sequence can provide the properties mentioned without the need for adhesion promoter layers, and in doing so, the properties are unexpectedly excellent in relation to existing test criteria, especially for the automotive sector as a fuel tube. In particular, an elongation at break according to ISO 527 of over 300% can be achieved.

The invention thus relates to a multilayer composite in the form of a hollow body enclosing an interior space and consisting of three layers, an inner layer adjoining the interior space, a middle layer adjoining the inner layer and an outer layer adjoining the middle layer and sealing the multilayer composite to the outside, wherein a further innermost layer may optionally be provided, which then directly adjoins the inner layer and is equipped to be conductive.

The inner layer is based on polyamide 6, the middle layer is based on EVOH and the outer layer is based on a blend of (A) polyamide 6 and (B) at least one other polyamide selected from the following group: polyamide 612, polyamide 614, polyamide 616 and polyamide 618.

The other polyamide is not polyamide 6.

Preferably the material of the outer layer, or even all of the layers of the multilayer composite, does not contain polyamide elastomers (TPE-A), such as from the group of polyetheramides, polyesteramides, polyetheresteramides, polyetheresteretheramides and mixtures thereof.

A first preferred embodiment is characterized in that the outer layer contains a plasticizer, e.g. based on sulfonamides or hydroxybenzoic acid esters, especially selected as N-butylbenzenesulfonamide (BBSA), an impact modifier and an adhesion promoter. In particular, this makes it possible to achieve the impact strength required for the above applications.

As hydroxybenzoicacidester-based plasticizer e.g. systems as follows are possible: 2-hexyldecyl-4-hydroxybenzoate, hexyloxyethoxyethyl p-hydroxybenzoate; hexyloxypropoxypropyl p-hydroxybenzoate; hexyloxybutoxybutyl p-hydroxybenzoate; octyloxyethoxyethyl p-hydroxybenzoate; octyloxypropoxypropyl p-hydroxybenzoate; octyloxybutoxybutyl p-hydroxybenzoate; 2'-ethylhexyloxyethoxyethyl p-hydroxybenzoate; 2'-ethylhexyloxypropoxypropyl p-hydroxybenzoate; 2'-ethylhexyloxybutoxybutyl p-hydroxybenzoate; decyloxyethoxyethyl p-hydroxybenzoate; decyloxypropoxypropyl p-hydroxybenzoate; decyloxybutoxybutyl p-hydroxybenzoate, or mixtures thereof.

Preferably, the outer layer contains at least the following additional components according to another preferred design:
(C1) a plasticiser, in particular preferably selected as BBSA, HDPB (2-hexyldecyl-4-hydroxybenzoate, CAS 148348-12-3) or a mixture thereof,
(C2) at least one impact modifier, and
(C3) at least one adhesion promoter.

The proportion of plasticizer (C1) is preferably in the range of 3-12 weight percent or in the range of 5-8 weight percent.

The proportion of impact modifier (C2) is preferably in the range of 10-30 weight percent, or in the range of 10-20 weight percent.

The proportion of adhesion promoter (C3) is preferably in the range of 3-12 weight percent or in the range of 5-10 weight percent.

These quantities of components (C1)-(C3) are each to be understood as in relation to 100 weight percent of the total mass of the material used to produce the outer layer.

Preferably, the outer layer consists exclusively of components (A), (B), (C1), (C2) and (C3) as well as additives if necessary, whereby these additives preferably consist of a copper stabilizer and a color masterbatch.

Another preferred embodiment of the proposed multilayer composite is characterized by the fact that the impact modifier of the outer layer (or also of the inner layer) is an ethylene/α-olefin copolymer, especially ethylene/butylene or ethylene/propylene copolymer, grafted with an anhydride, especially maleic anhydride. Mixtures of different such systems are also possible.

Furthermore, the adhesion promoter of the outer layer is preferably a polyethylene grafted with an anhydride, in particular maleic anhydride, in particular a LLDPE grafted in this way.

The outer layer of the multi-layer composite can, according to another preferred embodiment, consist of:
(A) 5-35% by weight of polyamide 6;

(B) 30-60% by weight of at least one of said other polyamides selected from the following group: polyamide 612, polyamide 614, polyamide 616 and polyamide 618;

(C) 20 to 40% by weight of other ingredients different from (A) and (B);

wherein the sum of components (A)-(C) makes 100% by weight of the material used to produce the outer layer.

Preferably, the other components (C) are composed as follows:

(C1) 3-8% by weight of plasticiser;
(C2) 9-30 weight percent impact modifier;
(C3) 3-10 weight percent adhesion promoter;
(C4) 0-3 percent by weight of additives, especially processing aids, UV stabilizers, heat stabilizers, pigments, masterbatch carriers or mixtures thereof. Here the proportions of (C1)-(C4) refer to the 100 percent by weight of the material for producing the outer layer formed by the sum of (A)-(C).

Preferably, the other polyamide (B) is exclusively polyamide 616 or 612.

The multilayer composite is preferably characterized in that at least one of said other polyamides (B) of the outer layer (5) is selected from the following group: polyamide 612, polyamide 614, polyamide 616 and polyamide 618, or all of them, when present in a blend, and have a relative solution viscosity, measured in m-cresol according to ISO 307 (2007) at a temperature of 20° C., in the range of 2.0-2.5, preferably 2.15-2.44.

The at least one of the said other polyamides (B) of the outer layer (5) can be selected from the following group: polyamide 612, polyamide 614, polyamide 616 and polyamide 618 and has more preferably a melting point in the range 180-240° C., preferably 185-225° C.

More specifically, the preferred polyamide 612 or 616 of the outer layer has a relative solution viscosity, measured in m-cresol according to ISO 307 (2007) at a temperature of 20° C., in the range 2.10-2.25, and/or a melting point in the range >200° C.

It is further preferred that the polyamide 6 of the outer layer has a relative solution viscosity measured in sulphuric acid (1 g polyamide in 100 ml sulphuric acid) according to ISO 307 (2007) at a temperature of 20° C. in the range of 3.0-3.8, preferably 3.30-3.7, in particular preferably 3.35-3.5, and/or that the polyamide 6 of the outer layer has a melting point in the range of 200-240° C., preferably 210-230° C.

The inner layer may preferably have a copper stabilisation, preferably based on CuI, in a proportion in the range 0.01-0.10 weight percent, or in a proportion of 0.03-0.07 weight percent.

In addition, the inner layer may contain an impact modifier, preferably in a proportion in the range of 10-25% by weight or in a range of 10-20% by weight. The impact modifier is preferably an ethylene/α olefin copolymer grafted with an anhydride, in particular maleic anhydride, in particular ethylene/butylene or ethylene/propylene copolymer grafted in this way. Mixtures of different such systems are also possible. Here the weight percentages refer in each case to 100 weight percent of the material used to produce the inner layer.

The multi-layer composite can also be characterised by the fact that the inner layer consists of:

(A_I) Polyamide 6, preferably having a relative solution viscosity, measured in sulphuric acid (1 g of polyamide in 100 ml of sulphuric acid) according to ISO 307 (2007) at a temperature of 20° C., in the range 3.5-3.8, preferably 3.6-3.75.

(B_I) 10-30 weight percent impact modifier
(C_I) 0.01-0.1 Weight percent copper stabilizer
(D_I) 0-15% by weight, preferably 5-10 or 0-1% by weight of additives, preferably selected from the group: conductivity additives, crystallization accelerators, processing aids, lubricants, and mixtures thereof where the sum of the components (A_I)-(D_I) adds up to 100% by weight of the material used to produce the inner layer.

The inner layer is preferably conductive, especially if there is no other innermost layer. In this case, the proportion of component (D_I) is typically in the range of 5-15 weight percent, and in the range of 5-10 weight percent (based on the sum of components (A_I)-(D_I)) is formed by a conductivity additive.

Another preferred design is characterized in that the component (D_I) contains at least one conductivity additive, this component being formed by a conductivity additive alone, preferably in a proportion in the range of 0.1-15 weight percent, based on the total mass of the inner layer. The electrically conductive material in the sense of the conductivity additive can be particles of metal fibres, metal powder, metal oxide powder, conductive carbon black, conductive carbon fibre, conductive carbon nanotubes, conductive graphite powder, conductive graphite fibre, graphene, bronze powder, bronze fibre, steel powder, steel fibre, iron powder, iron fibre, copper powder, copper fibre, silver powder, silver fibre, aluminium powder, aluminium fibre, nickel powder, nickel fibre, tungsten powder, tungsten fibre, gold powder, gold fibre, copper-manganese alloy powder, copper-manganese fibre and combinations thereof or mixtures thereof are mixed into the inner layer as component (D_I). If the inner layer is provided with electrical conductivity in this way, the inner layer preferably has a surface electrical resistance of not more than $10^8\Omega$ or not more than $10^6\Omega$, preferably not more than $10\Omega$. The proportion of electrically conductive material is preferably determined so that the surface electrical resistance of the inner layer falls within the above range. Preferably, the conductive particles of the conductivity additive have an average cross-sectional diameter of about 0.1 micron to about 100 microns. The conductive particles may be coated with a coating to provide coated conductive particles as the conductive particles.

The middle layer typically consists of an EVOH with an ethylene content in the range of 20-25 weight percent, preferably in the range of 25-30 weight percent.

The inner layer of such a structure preferably has a thickness in the range 0.3-0.6 mm, preferably in the range 0.4-0.5 mm.

The middle layer preferably has a thickness in the range 0.05-0.2 mm, preferably in the range 0.075-0.125 mm.

The outer layer preferably has a thickness in the range 0.3-0.6 mm, preferably in the range 0.4-0.5 mm.

The innermost layer preferably has a thickness in the range 0.08-1 mm, preferably in the range 0.1-0.9 mm.

As far as the overall structure is concerned, the total wall thickness of the multilayer composite is preferably in the range of 0.5-2.5 mm, and more preferably in the range of 0.75-1.5 mm.

Preferably, the proposed multi-layer structure is/will be produced in a co-extrusion process.

The multi-layer composite can be in the form of a pipe, which can be designed at least in sections as a corrugated pipe, preferably as a fuel pipe for internal combustion engines, especially in the automotive sector.

According to a preferred design, the pipe consists exclusively of the inner layer, the middle layer and the outer layer.

If there is an innermost layer, this is preferably polyamide-based or based on a thermoplastic fluoropolymer.

The polyamide base is then preferably selected from the group consisting of: PA 6, PA 12, PA 612, PA 10T/6T, PA 1212, PA 66, PA 11, PA 106, PA 1012, PA 10T/612, PA 10T/610, PA 9T. Such an innermost layer based on polyamide contains a conductivity additive and may additionally contain plasticizers, impact modifiers, adhesion promoters and/or additives. For example, 1-15% by weight of conductivity additive, 3-8% by weight of plasticizer, 9-30% by weight of impact modifier, 3-10% by weight of adhesion promoter, 0-3% by weight of additives, in particular processing aids, UV stabilizers, heat stabilizers, pigments, masterbatch carriers or mixtures thereof, the remainder being formed by the polyamide or the mixture of polyamides. Here the proportions refer to the 100 percent by weight of the material for the production of the innermost layer. The thermoplastic fluoropolymer for the innermost layer is preferably based at least on ethylene and tetrafluoroethylene, with or without further blocks selected from the group: propylene, in particular hexafluoropropylene blocks, hexene, in particular perfluorohexene blocks, preferably as a fluorine-containing ethylenic polymer with a carbonyl group, which in particular preferably does not contain any amide, imide, urethane or urea group.

The innermost layer can consist of the following components according to another preferred embodiment:
(a) 75-100% by weight, preferably 85-98% by weight of said polyamide base or fluoropolymer based on at least ethylene and tetrafluoroethylene, with or without hexafluoropropylene blocks and/or perfluorohexene blocks, preferably with carbonyl groups;
(b) 0-25% by weight of additives other than (c);
(c) 0.1-20 weight percent conductivity additive;
wherein components (a) and (c) add up to 100% by weight of the material of the innermost layer.

Component (b) is preferably selected from at least one additive of the following group: antioxidants, processing aids, UV stabilizers, heat stabilizers, pigments, masterbatch carriers, lubricants or mixtures thereof.

In particular preferably component (c) is at least one additive for increasing electrical conductivity, preferably in the form of particles of metal fibres, metal powder, metal oxide powder, conductive carbon soot, conductive carbon fibre, conductive carbon nanotubes, conductive graphite powder, conductive graphite fibre, graphene, bronze powder, bronze fibre, steel powder, steel fibre, iron powder, iron fibre, copper powder, copper fibre, silver powder, silver fibre, aluminium powder, aluminium fibre, nickel powder, nickel fibre, tungsten powder, tungsten fibre, gold powder, gold fibre, copper-manganese alloy powder, copper-manganese fibre and combinations thereof Component (c) preferably contains at least one conductivity additive in a proportion in the range of 1-15% by weight, in particular in a proportion of 3-8% by weight, based on the total mass of the innermost layer.

If the innermost layer is provided with electrical conductivity in this way, it preferably has a surface electrical resistance of not more than $10^8 \Omega$ or not more than $10^6 \Omega$, preferably not more than $10 \Omega$. The proportion of electrically conductive material is preferably determined so that the surface electrical resistance of the inner layer falls within the above range. Preferably, the conductive particles of the conductivity additive have an average cross-sectional diameter of about 0.1 micron to about 100 microns. The conductive particles may be coated with a coating to provide coated conductive particles as the conductive particles.

Furthermore, the present invention relates to a process for producing a multilayer composite as described above, the process being preferably characterized in that at least 2, preferably every 3 or 4 layers, are formed into a hollow body, in particular preferably into a tube or a conduit or a container, in a continuous and/or discontinuous process, preferably in an extrusion blow moulding, tandem extrusion, sheathing or coextrusion process.

Furthermore, the present invention relates to the use of such a multilayer composite as a tube for internal combustion engines, especially in the automotive sector, especially for fuel (e.g. diesel or petrol), urea or coolant.

Further embodiments are specified in the dependent claims.

BRIEF DESCRIPTION OF THE DRAWINGS

Preferred embodiments of the invention are described in the following on the basis of the drawings, which are for explanatory purposes only and are not to be interpreted restrictively. In the drawings shows.

DESCRIPTION OF PREFERRED FORMS OF EXECUTION

Figure 1:
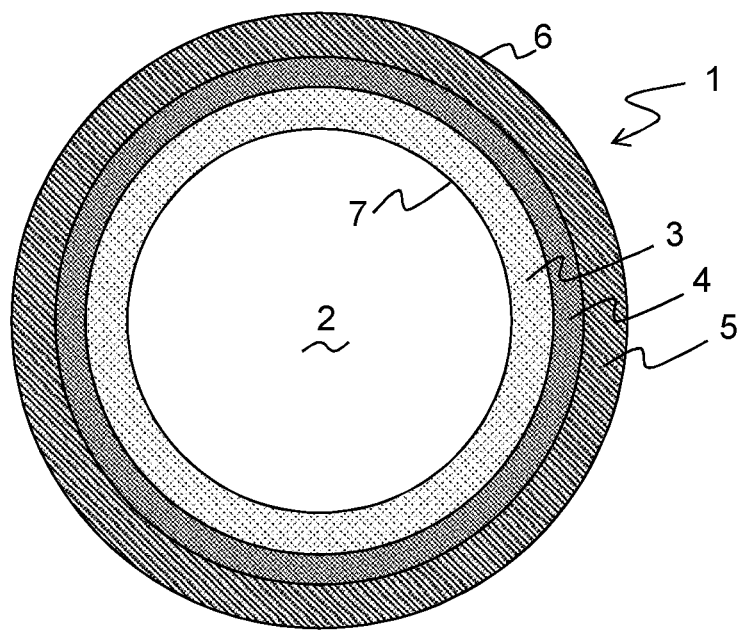
FIG. 1 a fuel tube with three layers in a sectional view perpendicular to the direction of flow.

FIG. 1 shows an exemplary fuel tube 1 according to the invention in a section transverse to the main direction.

The cross-sectional area can be constant over the main direction, i.e. the pipe can be essentially hollow cylindrical in shape.

However, the cross-sectional area can also vary over the main direction, for example in the form of a corrugated pipe.

An interior 2 is enclosed by the pipe wall. The inner chamber 2 is followed radially outwards by an inner layer 3, which borders on and delimits the inner chamber 2 with its inner surface 7. This inner layer is based on polyamide 6 without other polyamide components.

Directly adjacent to the inner layer 3 without an intermediate adhesion promoter layer is a middle layer 4 in the sense of a barrier layer, which is based on EVOH.

Directly adjacent to the outside of this middle layer 4 and again without an intermediate bonding agent layer is the outer layer 5, which is based on polyamide 616 in a blend with PA 6. The outer surface 6 of the outer layer 5 limits the tube to the outside.

Figure 2:
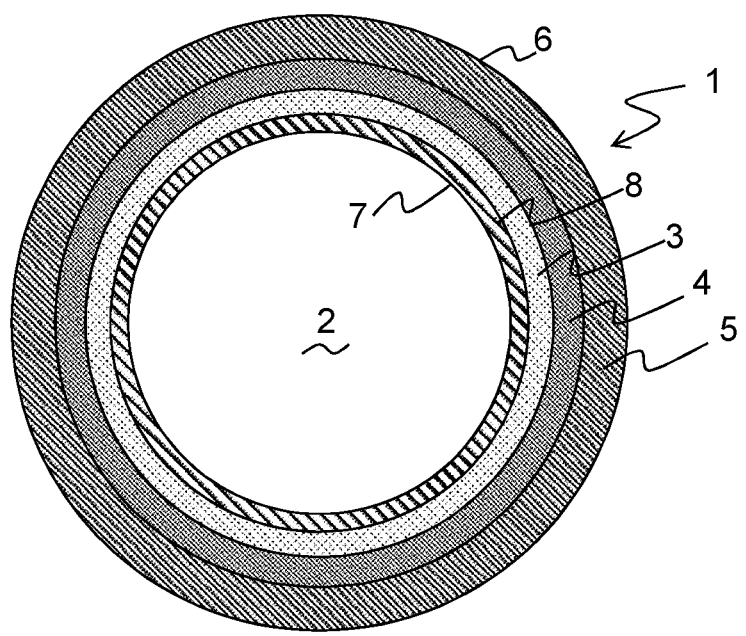
FIG. 2 a fuel tube with four layers in a sectional view perpendicular to the direction of flow.

An alternative exemplary fuel tube after the invention is shown in FIG. 2. Here, in addition to the three layers already described above, there is another innermost layer 7, which closes the fuel tube to the inside and in this case borders directly on the interior 2. This innermost layer has a conductive finish, i.e. it contains, for example, additives of conductive particles, such as conductive soot.

Starting Materials Used:
Polyamide 6 (I) (Outer Layer):
$\eta_{rel}$=3.4 (sulfuric acid);
Tm measured with DSC according to ISO 11357 (2011)= 222° C.
Polyamide 612 (Outer Layer):
$\eta_{rel}$=2.3 (m-cresol);
Tm measured with DSC according to ISO 11357 (2011)= 218° C.
Polyamide 616 (Outer Layer):
$\eta_{rel}$=2.2 (m-cresol);

Tm measured with DSC according to ISO 11357 (2011)= 196° C.

Polyamide 12 (Outer Layer, VB):
Grilamid L25, high viscosity polyamide 12, trading product of EMS-CHEMIE AG,
Domat/Ems, Switzerland
Melt volume rate (MVR): 275° C./5 kg, ISO 1133;
Tm measured with DSC according to ISO 11357 (2011)= 178° C.

Polyamide 610 (Outer Layer, VB):
Grilamid 2S 20 Natural, Polyamide 610 with relative viscosity 1.9-2.0, product of EMS-CHEMIE AG, Domat/Ems, Switzerland;
Tm measured with DSC according to ISO 11357 (2011)= 213° C.

Polyamide 6 (II) (Inner Layer):
$\eta_{rel}$=3.7 (sulfuric acid);
Tm measured with DSC according to ISO 11357 (2011)= 222° C.

Ethylene Vinyl Alcohol (Barrier Layer):
An ethylene/vinyl alcohol copolymer (EVOH) was used as material for the barrier layer. Specifically, the examples involved a product of the KURARAY company, which is available under the name EVAL® under the product designation F170B and has an ethylene content of 27 mol %. It is available in Europe from EVAL Europe N.V. in Zwijndrecht, Belgium.

Plasticizer (Outer Layer):
BBSA (N-butylbenzenesulphonamide) was used as the plasticiser (WM). This is available under the brand name Uniplex 214, from Lanxess.

Impact modifier (for inner and outer layer):
Acid-modified ethylene/α-olefin copolymers were used as impact modifiers (SZM), namely maleic anhydride-grafted ethylene-butylene and ethylene-propylene copolymers and mixtures thereof.

Impact Modifier of the Inner Layer:
MVR value (measured at 230° C./2.16 kg) of 1.2 g/10 min (ASTM D1238),
DSC glass transition temperature, according to ISO standard 11357-2 (2013) of −65° C.,
available under the name Tafmer MH5020C from Mitsui Chemicals.

Impact Modifier of the Outer Layer or the Inner Layer of the Comparative Example:
MVR value (measured at 230° C./2.16 kg) of 1.3 g/10 min (ASTM D1238),
DSC glass transition temperature, according to ISO standard 11357-2 (2013) of −60° C.,
available under the name Tafmer MC201 from Mitsui Chemicals.

Copper Stabilizer (Inner Layer):
CuI/KI (weight ratio 1:6) was used as copper stabiliser in a proportion of 0.05 weight percent in relation to the total mass of the inner layer. The copper (I) iodide is commercially available from Merck KGaA and the potassium iodide from Liquichem Handelsgesellschaft mbH.

Adhesion Promoter (Outer Layer):
The adhesion promoter (HVM) is a maleic anhydride grafted LLDPE, available from Mitsui Chemicals under the name Admer NF358E, with an MFR (190° C., 2.16 kg) of 1.6 g/10 min (ASTM D1238), a density of 0.91 g/cm$^3$ (ASTM D1505), and a Vicat Softening Point of 82° C. (ASTM D1525). Tm, measured in DSC according to ISO 11357-3 (2011) is 120° C.

Masterbatch (Outer Layer):
Euthylen Black, soot-based (40%) colour masterbatch based on PE, available from BASF (Ludwigshafen, Del.)

Production of the Test Specimens:
Pipes were co-extruded at mass temperatures between 210 and 260° C. under vacuum of −56 mbar and an extrusion speed of 32.8 m/min. Pipes with an outside diameter of 8 mm and a wall thickness of 1 mm were used as test specimens. The length of the pipe was adjusted according to the test requirements. The thickness of the inner layer was 0.45 mm, the middle layer 0.10 mm and the outer layer 0.45 mm.

Tests Carried Out on the Pipe Assemblies:
Washing out: Test according to SAE J2260 with test fuel FAM-B (according to SAE J1681 (2000))—test 96 hours, 60° C. sealed tube of 200 cm; maximum extract according to VW TL 52712 6 g/m2.

Cold behaviour: is tested in accordance with TL 52712 in line with VW standard PV 3905. The drop height of the ball is 65 cm. At least 10 test specimens are measured and the number of fractures is given as a percentage.

Pipe tensile test: Pipe tensile tests were carried out according to ISO 527-2 (2012). For tests, test specimens with a length of 150 mm (tensile tests in the direction of extrusion) or 10 mm (for tensile tests transverse to the direction of extrusion) were used. The test temperature was 23° C. and the test speed 100 mm/min (for tests in the direction of extrusion) or 25 mm/min (for tests transverse to the direction of extrusion).

Specifically, the following measurements were carried out according to ISO 527: elongation at break in the direction of extrusion, elongation at break transverse to the direction of extrusion, yield stress in the direction of extrusion, yield stress transverse to the direction of extrusion.

Layer adhesion: has been tested according to SAE J2260.
Relative viscosity: DIN EN ISO 307 (2007), in 0.5% by weight m-cresol solution or 1% by weight sulphuric acid solution (PA6) at a temperature of 20° C.

Thermal behavior (melting point Tm, melting enthalpy and glass transition temperature (Tg): ISO standard 11357-1 (2016), -2 (2013) and -3 (2011), granules, the differential scanning calorimetry (DSC) was carried out at a heating rate of 20° C./min.

TABLE 1

Compositions and structure

| | | B1 | | B2 | | VB1 | |
|---|---|---|---|---|---|---|---|
| | Unit | outer layer | inner layer | outer layer | inner layer | outer layer | inner layer |
| polyamide 612 | weight % | 44.25 | — | — | — | 72 | — |
| polyamide 616 | weight % | — | — | 44.25 | — | — | — |
| polyamide 6 (I) | weight % | 25.0 | — | 25.0 | — | — | — |
| polyamide 6 (II) | weight % | — | 78.55 | — | 78.55 | — | 70.1 |
| SZM (Tafmer MC201) | weight % | 20.0 | — | 20 | — | 18 | 19.5 |
| SZM (Tafmer MH5020C) | weight % | — | 20.00 | — | 20 | — | — |
| HVM | weight % | 5.0 | — | 5.0 | — | — | — |
| WM | weight % | 5.0 | — | 5.0 | — | 10 | 5.0 |

TABLE 1-continued

Compositions and structure

| | Unit | B1 outer layer | B1 inner layer | B2 outer layer | B2 inner layer | VB1 outer layer | VB1 inner layer |
|---|---|---|---|---|---|---|---|
| CuI/KI | weight % | — | 0.05 | — | 0.05 | — | — |
| Black master batch | weight % | 0.75 | 1.4 | 0.75 | 1.4 | — | 5.4 |

TABLE 2

Mechanical and chemical test results

| | | B1 | B2 | VB1 |
|---|---|---|---|---|
| Yield stress in extrusion direction | N/mm2 | 35 | 38 | 30 |
| Yield stress transverse to the extrusion direction | N/mm2 | 37 | 42 | 32 |
| Elongation at break in extrusion direction | % | 344 | 366 | 300 |
| Elongation at break transverse to the extrusion direction | % | 320 | 330 | 280 |
| Cold impact, −25° C., ball mass 880 g | % | No breakage | No breakage | 20 |
| Cold impact, −40° C., ball mass 500 g | % | No breakage | No breakage | 40 |
| Wash-out resistance, according to TL 52712 | g/m2 | 5.6 | 4.4 | 33.7 |
| Layer adhesion | | Layers not separable | Layers not separable | outer layer separable |

While all the examples show acceptable mechanical suitability for automotive applications, the cold behaviour of the tubes with a structure according of the invention is an unexpected and significant improvement over the comparative example. The comparative example clearly cannot meet the industrial requirements. Also with regard to elongation at break, the structures according to the invention are unexpectedly advantageous. The molding compounds of all examples can be co-extruded, but only the examples according to the invention show good adhesion between the outer layer and the intermediate layer of EVOH.

The unexpectedly good suitability of the pipes with a structure according to the invention for the application is also shown by the very good wash-out resistance. The industrial requirement according to TL 52712 is a washout of less than 6 g/m2 pipe surface. This requirement is fulfilled here only with the examples according to the invention. In order to allow further comparison with state of the art, in particular for comparison with the examples of EP-A-1 884 356, the structures shown in Table 3 were manufactured using the same process and tested for properties as shown in Table 4.

TABLE 3

Compositions and structure of further comparative examples VB2 and VB3

| | Unit | VB2 outer layer | VB2 inner layer | VB3 outer layer | VB3 inner layer |
|---|---|---|---|---|---|
| polyamide 6 (I) | weight % | 42.5 | | 42.5 | |
| polyamide 6 (II) | weight % | | 83 | | |
| polyamide 12 | weight % | 42.5 | | | |
| polyamide 610 | weight % | | | | 83 |
| Grilon XE 3871 | weight % | | | 42.5 | |
| SZM (Tafmer MC201) | weight % | 15 | 10 | 15 | |
| SZM (Tafmer MH15020C) | weight % | | | | 10 |
| WM | weight % | | 7 | | 7 |

TABLE 4

Mechanical and chemical test results VB2 and VB3

| | | VB2 | VB3 |
|---|---|---|---|
| Yield stress in extrusion direction | N/mm2 | 30 | 28 |
| Yield stress transverse to the extrusion direction | N/mm2 | 32 | 30 |
| Elongation at break in extrusion direction | % | 298 | 276 |
| Elongation at break transverse to the direction of extrusion | % | 280 | 249 |
| Cold impact, −25° C., ball mass 880 g | % | 30 | 30 |
| Cold impact, −40° C., ball mass 500 g | % | 40 | 40 |
| Wash-out resistance, according to TL 52712 | g/m2 | 42 | 48 |
| Layer adhesion | | outer layer separable | outer layer separable |

A reworking of the structures from D1 shows poor mechanical properties, especially with regard to impact strength and washout. The poor composition/combination of the layers also leads to layer separation.

The order of the additives (plasticizers) is reversed in the D1, thus the composition and structure of the D1 teaches away from the inventive structure, i.e. the compositions and sequences of the layers as claimed.

In connection with D1, it should be that the inner layers of D1 are mostly provided with plasticizer, which makes the washout unacceptable.

LIST OF REFERENCE SIGNS

| 1 | Fuel tube | 5 | Outer layer |
| 2 | Interior of 2 | 6 | Outside surface of 1 |
| 3 | Inner layer | 7 | Inner surface of 1 |
| 4 | Middle layer | 8 | innermost layer of 1 |

The invention claimed is:

1. A multilayer composite in the form of a hollow body enclosing an inner space, consisting of three layers, an inner layer adjoining the inner space, a middle layer adjoining the inner layer and an outer layer adjoining the middle layer and adjoining the multilayer composite to the outside, wherein the inner layer consists of:
(A_I) Polyamide 6;
(B_I) 10-30 weight percent impact modifier
(C_I) 0.01-0.1 weight percent heat stabilizer, comprising copper(I)
(D_I) 0.15-10 weight percent additives, selected from the group consisting of conductivity additives, crystallization accelerators, processing aids, lubricants, and mixtures thereof
where the sum of the components (A_I)-(D_I) add up to 100% by weight of the inner layer,
the middle layer comprises EVOH, and
wherein the outer layer consists of:
(A) 5-35% by weight of polyamide 6;
(B) 30-60% by weight of an other polyamide selected from the group consisting of: polyamide 612 and polyamide 616;
(C) 20 to 40% by weight of other components different from (A) and (B);
wherein the sum of components (A)-(C) is 100% by weight of the outer layer, the other components (C) being composed as follows:
(C1) 3-8 weight percent plasticizer;
(C2) 9-30 weight percent impact modifier being an ethylene/α-olefin copolymer grafted with an anhydride;
(C3) 3-10 weight percent adhesion promoter; and
(C4) 0-3% by weight of additives, including processing aids, UV stabilizers, heat stabilizers, pigments, masterbatch carriers or mixtures thereof,
where the proportions of (C1)-(C4) are based on the 100 weight percent of the outer layer formed by the sum of (A)-(C).

2. The multilayer composite according to claim 1, wherein the adhesion promoter (C3) is a polyethylene grafted with an anhydride.

3. The multilayer composite according to claim 1, wherein at least one of the other polyamide (B) of the outer layer has a relative solution viscosity, measured in m-cresol according to ISO 307 at a temperature of 20° C., in the range 2.0-2.5,
and/or in that at least one of the smoother polyamides polyamide (B) of the outer layer has a melting point in the range 180-240° C.,
and/or in that the polyamide 6 of the outer layer has a relative solution viscosity measured in sulphuric acid according to ISO 307 at a temperature of 20° C. in the range of 3.0-3.8,
and/or in that the polyamide 6 of component (A) of the outer layer has a melting point in the range from 200-240° C.

4. The multilayer composite according to claim 1, wherein the middle layer consists of an EVOH, with an ethylene content in the range of 20-25 percent by weight.

5. The multilayer composite according to claim 1, wherein the inner layer has a thickness in the range 0.3-0.6 mm, and/or that the middle layer has a thickness in the range of 0.05-0.2 mm, and/or that the outer layer has a thickness in the range of 0.3-0.6 mm.

6. The multilayer composite according to claim 1, wherein it is produced in a co-extrusion process.

7. The multilayer composite according to claim 1, wherein said other polyamide (B) of the outer layer is exclusively polyamide 612.

8. The multilayer composite according to claim 1 in the form of a pipe which can be structured at least in sections as a corrugated pipe.

9. The multilayer composite according to claim 1, wherein said plasticizer in the outer layer
is selected as a hydroxybenzoic acid ester or sulfonamide-based plasticizer or a mixture thereof.

10. The multilayer composite according to claim 1, wherein said plasticizer in the outer layer
is selected as BBSA, HDPB or a mixture thereof
and wherein
the proportion of plasticiser (C1) is in the range of 5-8% by weight, based on the total mass of the outer layer as 100 percent by weight;
and/or wherein in the outer layer the proportion of impact modifier (C2) is in the range of 10-20% by weight, based on the total mass of the outer layer as 100 percent by weight
and/or wherein in the outer layer the proportion of adhesion promoter (C3) is in the range of 5-10% by weight, based on the total mass of the outer layer as 100 percent by weight.

11. The multilayer composite according to claim 1, wherein the adhesion promoter (C3) is a polyethylene grafted with maleic anhydride.

12. The multilayer composite according to claim 1, wherein the adhesion promoter (C3) an LLDPE grafted with maleic anhydride.

13. The multilayer composite according to claim 1, wherein at least one of the said other polyamide (B) of the outer layer has a relative solution viscosity, measured in m-cresol according to ISO 307 at a temperature of 20° C., in the range 2.15-2.4,
and/or in that at least one of the said other polyamide (B) of the outer layer has a melting point in the range 185-225° C.,
and/or in that the polyamide 6 (A) of the outer layer has a relative solution viscosity measured in sulphuric acid according to ISO 307 at a temperature of 20° C. in the range of 3.30-3.7, and/or in that the polyamide 6 (A) of the outer layer has a melting point in the range from 210-230° C.

14. The multilayer composite according to claim 1, wherein
the inner layer contains said impact modifier in a proportion in the range of 10-25% by weight,
wherein the weight percentages are ased on 100 weight percent of the inner layer.

15. The multilayer composite according to claim 1, wherein the middle layer consists of an EVOH with an ethylene content in the range of 25-30 percent by weight.

16. The multilayer composite according to claim 1, wherein
the inner layer has a thickness in the range 0.4-0.5 mm,
and/or that the middle layer has a thickness in the range of 0.075-0.125 mm,
and/or that the outer layer has a thickness in the range of 0.4-0.5 mm.

17. The multilayer composite according to claim 1, wherein the total wall thickness of the multilayer composite is in the range of 0.5-2.5 mm.

18. The multilayer composite according to claim 1 in the form of a pipe which can be structured at least in sections as a corrugated pipe, as a fuel pipe for combustion engines, in the automotive sector.

19. The multilayer composite according to claim 1, wherein the inner layer has a heat stabilization (C_I) comprising CuI, in a proportion in the range of 0.03-0.07 weight percent, the weight percentage based on 100 weight percent of the inner layer;

and/or in that the inner layer contains said impact modifier in a proportion in the range of 10-20% by weight, the weight percentage based on 100 weight percent of the inner layer.

20. The multilayer composite according to claim 1, wherein the polyamide 6 of the inner layer has
a relative solution viscosity measured in sulphuric acid according to ISO 307 at a temperature of 20° C. in the range 3.6-3.75.

21. The multilayer composite according to claim 1, wherein the total wall thickness of the multilayer composite is in the range of 0.75-1.5 mm.

22. A multilayer composite in the form of a hollow body enclosing an inner space, consisting of four layers, an inner layer, a further innermost layer directly adjacent to said inner layer and being conductive and adjoining the multilayer composite to the inside, a middle layer adjoining said inner layer, and an outer layer adjoining said middle layer and adjoining the multilayer composite to the outside,
wherein the inner layer consists of:
(A_I) Polyamide 6;
(B_I) 10-30 weight percent impact modifier
(C_I) 0.01-0.1 weight percent heat stabilizer, comprising copper(I)
(D_I) 0.15-10 weight percent additives, selected from the group consisting of conductivity additives, crystallization accelerators, processing aids, lubricants, and mixtures thereof
where the sum of the components (A_I)-(D_I) add up to 100% by weight of the inner layer,
the middle layer comprises EVOH, and
wherein the outer layer consists of:
(A) 5-35% by weight of polyamide 6;
(B) 30-60% by weight of at least one of said an other polyamides polyamide selected from the group consisting of: polyamide 612 and polyamide 616;
(C) 20 to 40% by weight of other components different from (A) and (B);
wherein the sum of components (A)-(C) is 100% by weight of the material used to produce the outer layer, the other components (C) being composed as follows:
(C1) 3-8 weight percent plasticizer;
(C2) 9-30 weight percent impact modifier being an ethylene/a-olefin copolymer grafted with an anhydride;
(C3) 3-10 weight percent adhesion promoter; and
(C4) 0-3% by weight of additives, including processing aids, UV stabilizers, heat stabilizers, pigments, masterbatch carriers or mixtures thereof, where the proportions of (C1)-(C4) are based on the 100 weight percent of the outer layer formed by the sum of (A)-(C).

23. The multilayer composite according to claim 22, wherein the innermost layer comprises polyamide or a thermoplastic fluoropolymer,
and/or wherein the innermost layer consists of the following components:
(a) 75-100% by weight, of a polyamide base or fluoropolymer based on at least ethylene and tetrafluoroethylene, with or without hexafluoropropylene blocks and/or perfluorohexene blocks;
(b) 0-25% by weight of additives other than (c);
(c) 0.1-20 weight percent conductivity additive;
wherein the components (a) and (c) add up to 100 weight percent of the material of the innermost layer.

24. The multilayer composite according to claim 23, wherein component (b) is selected from at least one additive from the following group: antioxidants, processing aids, UV stabilizers, heat stabilizers, pigments, masterbatch carriers, lubricants or mixtures thereof.

25. The multilayer composite according to claim 23, wherein component (b) contains at least one conductivity additive, in a proportion in the range of 1-15% by weight, based on the total mass of the innermost layer.

26. The multilayer composite according to claim 22, wherein the innermost layer comprises polyamide or a thermoplastic fluoropolymer,
wherein the polyamide is selected from the group consisting of PA 6, PA 12, PA 612, PA 10T/6T, PA 1212, PA 66, PA 11, PA 106, PA 1012, PA 10T/612, PA 10T/610, PA 9T, and/or
the thermoplastic fluoropolymer comprises at least ethylene and tetrafluoroethylene, with or without further blocks selected from the group: propylene blocks, including hexafluoropropylene blocks, hexene blocks, including perfluorohexene blocks,
and/or that the innermost layer consists of the following components:
(a) 85-98% by weight of said polyamide or fluoropolymer comprising at least ethylene and tetrafluoroethylene, with or without hexafluoropropylene blocks and/or perfluorohexene blocks;
(b) 0-25% by weight of additives other than (c);
(c) 0.1-20 weight percent conductivity additive;
wherein the components (a) and (c) to 100 weight percent of the material of the innermost layer.

27. The multilayer composite according to claim 22, wherein the innermost layer comprises polyamide or a thermoplastic fluoropolymer,
wherein the thermoplastic fluoropolymer is a fluorine-containing ethylenic polymer with a carbonyl group, which does not contain any amide, imide, urethane or urea group,
and/or that the innermost layer consists of the following components:
(a) 85-98% by weight of said polyamide or fluoropolymer comprising at least ethylene and tetrafluoroethylene, with or without hexafluoropropylene blocks and/or perfluorohexene blocks, with carbonyl groups;
(b) 0-25% by weight of additives other than (c);
(c) 0.1-20 weight percent conductivity additive;
wherein the components (a) and (c) to 100 weight percent of the material of the innermost layer.

28. The multilayer composite according to claim 23, wherein component (c) contains at least one additive for increasing electrical conductivity, in the form of particles of metal fibres, metal powder, metal oxide powder, conductive carbon black, conductive carbon fibre, conductive carbon nanotubes, conductive graphite powder, conductive graphite fibre, graphene, bronze powder, bronze fibre, steel powder, steel fibre, iron powder, iron fibre, copper powder, copper fibre, silver powder, silver fibre, aluminium powder, aluminium fibre, nickel powder, nickel fibre, tungsten powder, tungsten fibre, gold powder, gold fibre, copper-manganese alloy powder, copper-manganese fibre, or a combination thereof.

29. The multilayer composite according to claim 23, wherein component (b) contains at least one conductivity additive, in a proportion in the range of 3-8% by weight, based on the total mass of the innermost layer.

30. A method for producing the multilayer composite according to claim 1, wherein the multilayer composite is formed into a hollow body, in a continuous or discontinuous process.

31. The method according to claim 30, wherein the multilayer composite is formed into a pipe or a tube or a container, in a continuous and/or discontinuous process, in an extrusion blow moulding, tandem extrusion, sheathing or coextrusion process.

32. A method of using the multilayer composite according to claim 1 as a tube for combustion engines.

33. The method of using according to claim 32 as a tube for internal combustion engines, in the automotive sector, for fuel, urea or coolant.

* * * * *